United States Patent
Rossmann et al.

(10) Patent No.: US 7,701,207 B2
(45) Date of Patent: Apr. 20, 2010

(54) SENSOR, IN PARTICULAR A MAGNETIC FIELD SENSOR, WITH INTERFERENCE COMPENSATION AND METHOD FOR INTERFERENCE COMPENSATION OF A SENSOR

(75) Inventors: Siegfried Rossmann, Kuehnsdorf (AT); Colin Steele, Edinburgh (GB); Marcel Urban, Fernitz (AT)

(73) Assignee: Austriamicrosystems AG, Unterpresmstatten (AU)

( * ) Notice: Subject to any disclaimer, the term of this patent is extended or adjusted under 35 U.S.C. 154(b) by 414 days.

(21) Appl. No.: 11/517,837

(22) Filed: Sep. 5, 2006

(65) Prior Publication Data
US 2007/0114988 A1    May 24, 2007

Related U.S. Application Data

(63) Continuation of application No. PCT/EP2005/000219, filed on Jan. 12, 2005.

(30) Foreign Application Priority Data
Mar. 3, 2004    (DE) .................. 10 2004 010 362

(51) Int. Cl.
    *G01R 33/06* (2006.01)
(52) U.S. Cl. .................................... 324/251; 324/207.2
(58) Field of Classification Search ............ 324/207.12, 324/207.2, 225, 251, 117 H; 327/291, 310, 327/384–386, 510, 511, 551; 338/32 H; 73/DIG. 3; 326/26
See application file for complete search history.

(56) References Cited

U.S. PATENT DOCUMENTS

| 5,003,262 | A | 3/1991 | Egner et al. |
| 5,459,432 | A | 10/1995 | White et al. |
| 5,604,433 | A | 2/1997 | Thues et al. |
| 5,621,319 | A | 4/1997 | Bilotti et al. |
| 5,721,547 | A | 2/1998 | Longo et al. |
| 6,498,409 | B1 | 12/2002 | Collier-Hallman |
| 7,085,657 | B2 | 8/2006 | Drossel |
| 2003/0178989 | A1 | 9/2003 | Vig et al. |

FOREIGN PATENT DOCUMENTS

| DE | 38 17 574 C2 | 7/1992 |
| DE | 44 31 703 A1 | 3/1996 |
| DE | 196 50 184 A1 | 6/1997 |
| DE | 102 29 804 A1 | 3/2003 |
| DE | 101 60 794 A1 | 6/2003 |
| EP | 0 525 235 B1 | 7/1991 |

*Primary Examiner*—Reena Aurora
(74) *Attorney, Agent, or Firm*—Cohen Pontani Lieberman & Pavane LLP

(57) ABSTRACT

A sensor, in particular a Hall sensor, comprising a sensor element (1; 10) which outputs a sensor signal (SS) containing an interference signal (STS). An evaluation device (6; 20) is connected to the sensor element and contains a subtractor (2; 21) which subtracts the interference signal from the sensor signal. The sensor contains a filter device (3), which filters out the interference signal from the sensor signal. The sensor and a related method enable compensation of the interference signal.

15 Claims, 2 Drawing Sheets

SENSOR, IN PARTICULAR A MAGNETIC FIELD SENSOR, WITH INTERFERENCE COMPENSATION AND METHOD FOR INTERFERENCE COMPENSATION OF A SENSOR

RELATED APPLICATIONS

This is a continuation of International Application No. PCT/EP2005/000219, filed on Jan. 12, 2005, which claims priority from German Patent Application No. 10 2004 010 362.3, filed on Mar. 3, 2004, the content of which is hereby incorporated by reference.

FIELD OF THE INVENTION

The invention relates to a sensor, in particular a magnetic field sensor, comprising a sensor element which outputs a sensor signal containing an interference signal. An evaluation device is connected to the sensor element and contains a subtractor which subtracts a compensation signal from the sensor signal. The invention furthermore relates to a method for interference signal compensation of a sensor.

BACKGROUND OF THE INVENTION

A sensor and its evaluation circuit used to evaluate the sensor signal quite generally have interference signals that are superposed on the useful signal that is actually to be generated, i.e. the measurement signal. These include, in particular, a superposed DC signal, the offset, and the temperature dependence thereof. These influence the components of the sensor and corrupt the measurement signal and also the linearity and operating point of the evaluation elements.

Known examples of applications for sensors relate to magnetic field sensors and in particular Hall sensors comprising Hall elements. A Hall element outputs a voltage signal in the magnetic field as a Hall signal if a current flows through it perpendicular to the magnetic field. The Hall signal, that is to say the Hall voltage is dependent on the product of the vertical component of the magnetic flux density, the Hall current and the Hall constant. The Hall constant, which specifies the sensitivity of the Hall element, is material-dependent. During operation in practice, the offset composed of the offsets of the Hall element and the downstream evaluation device is superposed on the useful signal of the Hall voltage formed from the Hall constant of the component, the vertical component of the magnetic flux density and the Hall current.

U.S. Pat. No. 5,260,614 discloses a method and a magnetic field sensor with self-compensation by means of a thermal and technological coupling of the Hall element and its supply devices. For this purpose, the corresponding elements are embodied jointly in an integrated circuit. An offset voltage is superposed on the Hall voltage by means of a hysteresis circuit.

A further magnetic field sensor is disclosed in U.S. Pat. No. 5,604,433, wherein a magnetic field sensor is proposed which enables a greater accuracy by taking account of an offset of the Hall element.

U.S. Pat. No. 5,621,319 discloses a clocked Hall sensor comprising a sample-and-hold circuit and a summation element with dynamic offset suppression. It describes how the offset is eliminated by means of a summation with the aid of two signals generated from currents flowing perpendicular to one another through the Hall sensor. The method is also known as the "Spinning Current" technique. The subject matter of this document is hereby incorporated herein by reference.

US 2003/017 8989 A1 discloses a gearwheel detector with offset compensation of a magnetic field, which compensation involves recovering the sensor signal at the output of the evaluation circuit and feeding it back to the input of the evaluation circuit in order to compensate for the offset generated by the DC magnetic field. Although the detector largely eliminates said offset, the document describes that a considerable inaccuracy remains in the interference signal to useful signal ratio. The document furthermore explains that frequency discrimination does not suffice for removing the offset.

As a further example of an application, EP 0916074 B1 specifies a magnetic rotation sensor, in which a magnet mounted on an axis is arranged above a Hall element. The Hall element itself comprises a number of individual sensor elements which are in a specific geometrical arrangement with respect to one another. Each arrangement with a downstream preamplifier for the corresponding signal is referred to as a channel. The evaluation device connected downstream of the Hall element determines the rotation angle of the axis from the Hall signals of the channels. Each channel has an offset signal of the sensor arrangement and an offset of the preamplifier, to which the offset of the evaluation device is added. As a result, the actual useful signal is corrupted and an incorrect output value is determined.

A similar situation holds true if the Hall signal is digitized for the purpose of digital further processing.

SUMMARY OF THE INVENTION

One object of the invention is to provide a sensor and a method which results in a better interference signal behavior of the sensor.

This and other objects are attained in accordance with one aspect of the present invention directed to a sensor, comprising a sensor element which outputs a sensor signal containing an interference signal, and an evaluation device which is connected to the sensor element and contains a subtractor which subtracts the interference signal from the sensor signal, wherein the sensor contains a chopper device and a filter device.

Another aspect of the present invention is directed to a method for filtering an interference signal from an interference-signal-beset signal of a sensor, comprising alternately chopping the interference-signal-beset signal in a chopper device, and filtering out the interference signal from an output signal of the chopper device by means of a high-pass filter or a bandpass filter.

Another aspect of the present invention is directed to a method for compensating for an interference signal contained in an interference-signal-beset signal of a sensor, comprising alternately chopping the interference-signal-beset signal by means of a chopper device, and then filtering out an output signal of the chopper device by means of a high-pass filter or a bandpass filter in order to filter out the interference signal; and subtracting the interference signal from the sensor signal.

In one embodiment of the invention, the sensor contains a filter device, by means of which the interference signal, in particular the offset, is filtered out from the sensor signal and fed back to a subtraction element in the output circuit of the sensor element. In this case, "interference signal" means that the interference signal in the context of the technical realization (circuitry) of the evaluation device is recovered and filtered out as far as possible and ideally completely in the feedback path.

The invention makes it possible not only to reduce the interference signal component of the output signal to zero or a minimum, but also to hold the operating point of the output amplifier of the sensor element in an optimum linear range. The output signal of the sensor corresponds to the desired measurement signal to the greatest possible extent.

It is advantageous if the sensor contains a chopper device, which alternately inverts the signal present at its input, and if a high-pass filter device connected downstream of the chopper filters out the interference signal. If, in one preferred embodiment, the chopper is arranged in the sensor element or in the signal path as far as possible directly downstream of the actual sensitive element, e.g. the Hall cell, and upstream of the subtractor, interference signal components both of the sensor element and of the evaluation device can be compensated for. If, by contrast, the chopper is arranged in the signal path downstream of the subtractor of the evaluation device, interference signal components of the evaluation device are compensated for.

It is furthermore advantageous if the high-pass filter device controls a counter, the counter value of which corresponds to the value of the interference signal, and a digital-to-analog converter is connected downstream of the counter, which converter converts the counter value into an analog signal. The counter is to be regarded as an integrator.

In particular, the measurement signal can be subjected to digital further processing, for example in a computer, if the evaluation device contains an analog-to-digital converter, which digitizes the output signal of the subtractor. The advantages of digital technology can thus be applied to the sensor.

It is an advantageous configuration if the analog-to-digital converter is a first-order or higher-order sigma-delta modulator. The digitized signal can thus be processed further as a simple sequence of pulses or bits.

It is provided that a demodulator is connected downstream of the analog-to-digital converter. The signal component inverted in the course of chopping is thereby reversed again or once again inverted and the original signal or preferably the signal derived therefrom is obtained, which can subsequently be filtered.

By means of a load circuit connected downstream of the subtractor, the current signal of the sensor element can be converted into a voltage signal suitable for digital signal processing.

The method for eliminating the interference signal provides for the interference signal to be filtered out from the sensor signal and to be subtracted from the sensor signal at the output of the sensor element.

BRIEF DESCRIPTION OF THE DRAWINGS

The invention is explained in more detail below on the basis of exemplary embodiments and associated Figures in the drawing. The Figures serve solely for illustrating the invention and are therefore represented only in schematic fashion and not true to scale. Identical or identically acting elements are provided with identical reference symbols. In the Figures.

DETAILED DESCRIPTION OF THE DRAWINGS

Figure 1:
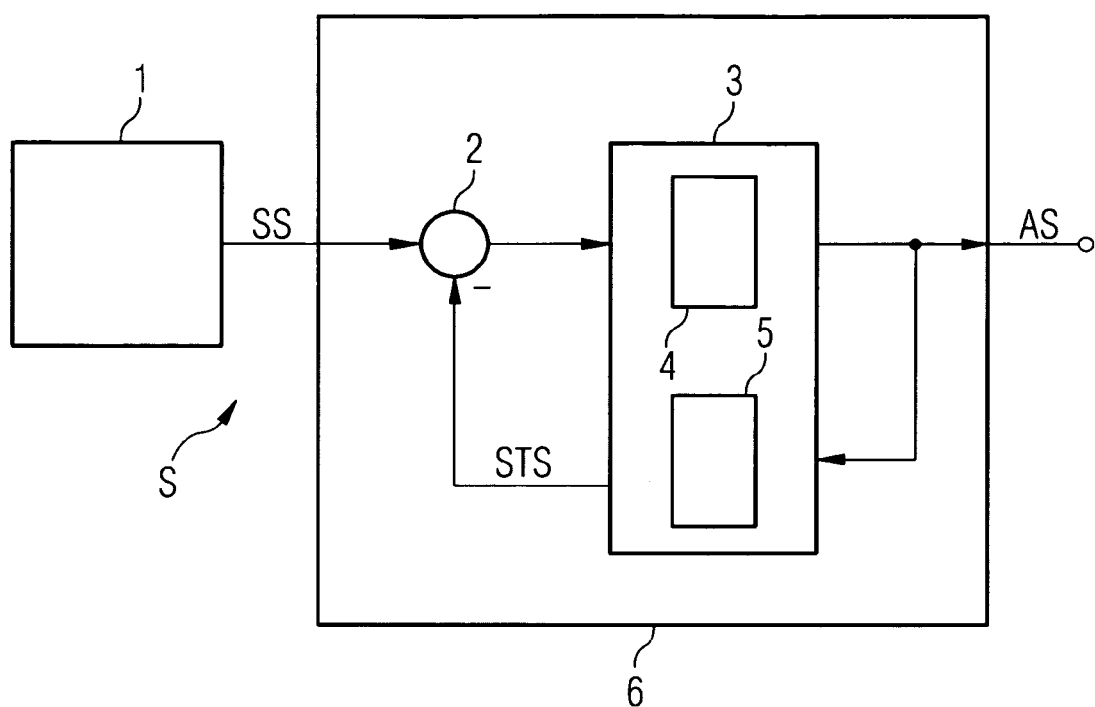
FIG. 1 shows a schematic construction of a sensor with interference signal compensation.

In accordance with FIG. 1, the sensor S contains a sensor element 1, which detects the measurement quantity to be detected. The sensor signal SS is available at the output of the sensor element and is applied to an input of a subtractor 2 of the evaluation device 6. The output signal of the subtractor passes to a filter device 3 containing a chopper device 4. The chopper alternately generates an inverted partial signal and a noninverted partial signal from the input signal. The chopper frequency is chosen to be correspondingly higher than the highest signal frequency.

In contrast to what is shown in FIG. 1, the chopper need not be an element of the evaluation device. If the chopper is arranged in the sensor element, e.g. the Hall cell, and upstream of the output amplifier of the sensor element or in the signal path as far as possible directly downstream of the measurement-quantity-sensitive element, interference signal components both of the sensor element and of the evaluation device can be compensated for.

The output signal AS of the sensor S is available at the output of the filter device. At the same time, the output signal is fed to a high-pass filter or a selective bandpass filter 5, which is likewise contained in the filter device 3 and is connected to the subtraction input of the subtractor. This results in a closed control loop, the output signal of which is largely free of interference signals. The high-pass filter device 5 filters out the interference components from the output signal, so that the interference signal STS is provided at the output of the feedback path, that is to say the other output of the filter device, and is fed back to the second input of the subtractor 2. In this case, the subtractor subtracts the interference signal from the sensor signal.

As a result of the chopping, the interference components of the chopped signal, e.g. of the offset, which are present typically in the low-frequency range and in particular also as a DC signal, are shifted into a high frequency range. The further upstream in the measurement signal chain the chopping is effected, the more interference signal components can thereby be shifted to high frequencies. These signal components can then be extracted by means of the high-pass filter 5.

On account of the closed control loop by means of which the interference signal is subtracted from the sensor signal, the interference signal component of the sensor is controlled to a minimum. The actual measurement signal AS is therefore provided essentially in a manner free of interference signals at the output of the filter device.

At the same time, the feedback described enables the output operating point of an output amplifier contained in the sensor element 1 to be held in its optimum linear range. Likewise, the dynamic range of the evaluation device is utilized better.

The dynamic interference signal compensation described with reference to FIG. 1 makes it possible to set a sensor operating point that is largely independent of temperature and process fluctuations. High requirements made of the linearity of the entire sensor can thus be realized without the sensor having to be manually adjusted.

Figure 2:
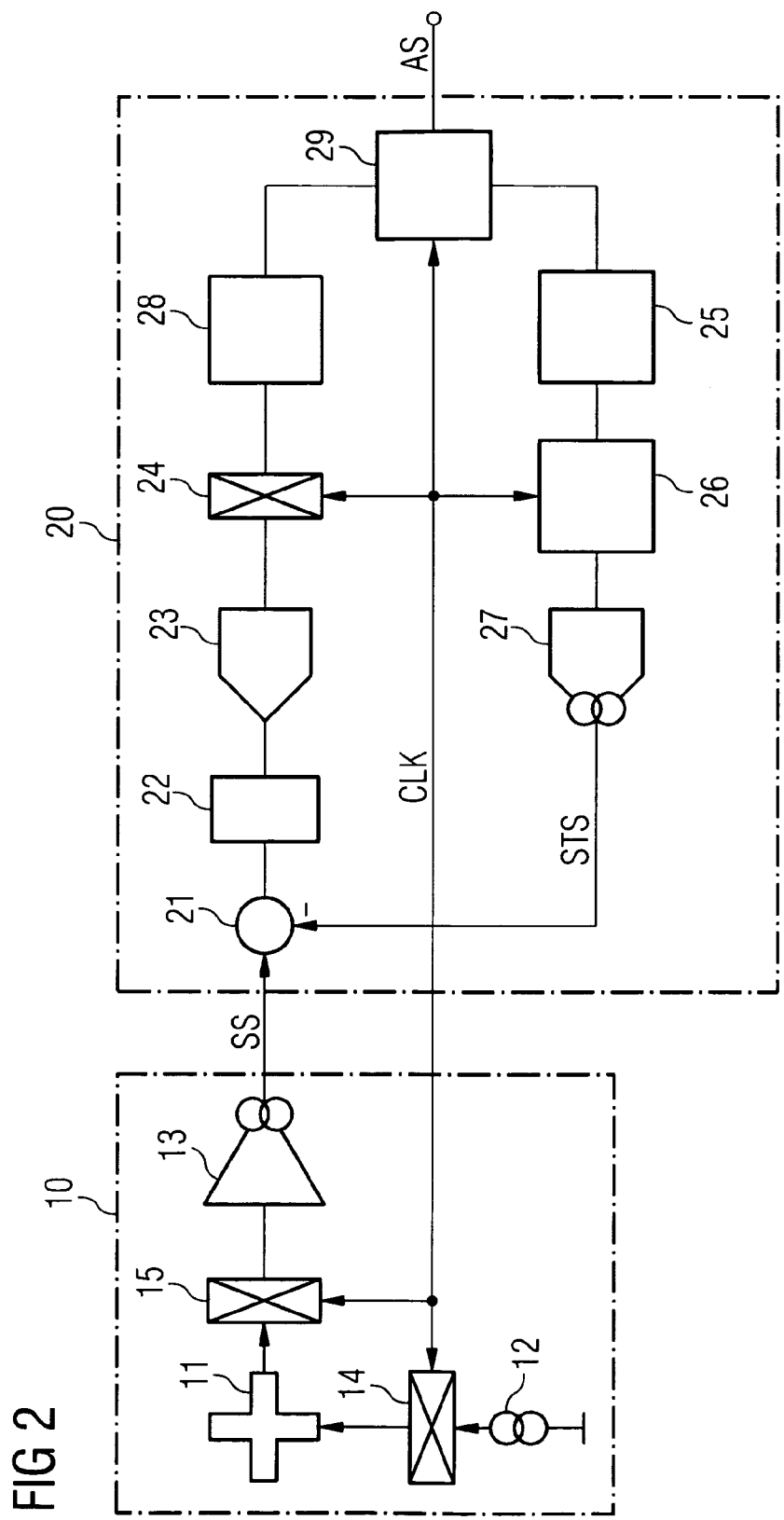
FIG. 2 shows a detailed schematic illustration of a sensor with digital signal processing and interference signal compensation.

The principle of the invention, which has been explained fundamentally with reference to the schematic illustration of FIG. 1, is explained in more detail below with reference to a concrete exemplary embodiment in accordance with FIG. 2. In this case, FIG. 2 shows a magnetic field sensor, in which the sensor element 10 contains a Hall arrangement 11. The Hall arrangement 11 is fed by a Hall current from a Hall current source 12 known per se. The output signal of the Hall arrangement 11 is converted into the sensor signal SS with the aid of an output amplifier 13, said sensor signal being provided at the output of the sensor element 10.

The elements of the Hall arrangement 11 are arranged and operated in such a way that two Hall signals shifted by 90° relative to one another can be generated by one channel of the Hall arrangement. In this way, the Hall arrangement 11 makes it possible to use the spinning current technique described in the introduction. For this purpose, two clocked changeover elements 14 and 15 are provided respectively at the input and the output of the sensor arrangement 11. The Hall signals of the Hall arrangement that are provided at the output of the clocked changeover switch 15 are Hall voltages which, in the exemplary embodiment, are converted into current signals with the aid of the output amplifier 13 embodied as a transconductance amplifier. Each of the current signals forms the sensor signal SS.

At the summation or subtraction node, further sensor elements (Hall elements) of an array may also be combined and compensated in parallel.

In principle, it is possible in a known manner largely to eliminate the offset of the Hall arrangement by means of the spinning current technique and the clocked changeover switches 14 and 15. However, this compensation does not meet higher requirements, in particular also because the sensor signal has to be processed further and the downstream circuit elements of the sensor themselves generate interference signals, e.g. an offset. The invention therefore continues further and also includes downstream components of the evaluation device in the interference signal compensation in order to achieve a further improvement and a linear behavior of the sensor.

Only the interference signal compensation of one of the two Hall signals depicted is described below, for the sake of simplicity. It goes without saying that the signal processing is also carried out with the second Hall signal of the channel. Moreover, the invention can also be correspondingly applied to multichannel sensors.

The sensor signal SS is beset with interference, in particular by an offset. The latter arises for example because the supply current supplied by the current source 12 has a varying magnitude, depending on the area of use, and may furthermore be temperature-dependent.

In the exemplary embodiment, the clocked switch 15 (e.g., a transistor) is used virtually in a dual function firstly as an element for the spinning current technique and secondly as a chopper, which alternately inverts and does not invert the Hall signal present at the output of the Hall arrangement 11 with a frequency, said Hall signal having acquired the interference signal. The frequency is chosen to be high enough that the interference signal can be separated from the useful signal by means of a highpass or bandpass filter. Therefore, the output signal of the Hall arrangement is present both in inverted fashion and in noninverted fashion at the input of the output amplifier 13.

On the output side, the output amplifier of the sensor element is connected to the evaluation device 20. The latter contains a subtractor 21 on the input side, which subtractor receives the output signal of the amplifier 13 at one input. The fed-back signal is present at the other input of the subtractor, which signal corresponds to the interference signal and is subtracted from the sensor signal. A load circuit 22 is connected downstream of the subtractor on the output side. The load circuit has the task of predetermining the operating point of the evaluation device and converting the current output signal of the output amplifier 13 or of the subtractor 21 into a voltage.

An analog-to-digital converter (ADC) 23 is connected downstream of the load circuit 22. Various embodiments of the analog-to-digital converter are possible, in principle. In the exemplary embodiment, the ADC 23 is provided as a sigma-delta modulator. The sigma-delta modulator converts the input signal present into a digital output signal and generates a high-frequency bit stream. The digitized output signal of the ADC is processed digitally.

In accordance with FIG. 2, a further clocked component 24 is connected downstream of the ADC, and performs a demodulation. The demodulator 24 may be an EXOR, for example. At the output of the clocked demodulator 24, the useful signal or measurement signal is once again present in digital form, in each case reduced or increased by the interference signal. The low-frequency interference signal or DC signal shifted toward high frequencies can then be filtered out by means of a high-pass filter or a bandpass filter or, conversely, the useful signal can be filtered out by means of a low-pass filter.

In principle, it is not necessary in the case of sensors for the clocked switch 15, which generates an inverting and a non-inverting signal from the output signal of the sensor, to be arranged in the sensor element. Rather, the chopper 15 may also be connected downstream of the sensor element; by way of example, as shown in FIG. 1, it may also be provided in the evaluation device and e.g. be connected upstream of the ADC. In this case, only interference signal components of the evaluation device can be filtered.

In the exemplary embodiment of FIG. 2, it is provided that a bandpass filter or high-pass filter 25 is connected downstream of the demodulator 24, which filter is used to filter out the interference signal shifted into the high frequency range. The output signal of the high-pass filter is synchronously rectified and used to drive an up/down counter 26 with an integrator function, which counts a clock present at another input. In principle, it suffices for this purpose for the most significant bit of the output signal of the high-pass filter, i.e. the sign bit, to be used as the input signal of the counter. Said bit indicates to the counter 26 whether it is to effect up-counting or down-counting.

The counter value of the counter 26 in turn is fed to a digital-to-analog converter 27, which determines an analog output in a manner known per se. In the exemplary embodiment, this is a current signal, which is passed to the negative input of the subtractor 21. This output signal of the DAC thus corresponds, in the context of the technically realized (circuitry) accuracy, to the analog interference signal, which is subtracted from the interference-signal-beset output signal of the sensor element 10 in this feedback loop. The embodiment of the evaluation device with a high-pass filter device, counter and DAC stabilizes the control loop.

One configuration of the invention provides for a digital filter 28 containing a decimation filter to be connected downstream of the demodulator 24. The digital filter makes it possible to effect a filtering of the high-frequency bit stream of the demodulator 24, for example a decimation, by means of which the bit stream is converted into a digital signal that can be utilized better.

A further configuration may provide for a sampling arrangement 29 to be connected downstream of the decimation filter 28, which sampling arrangement stores its sampled value for a predetermined time and forwards it to the high-pass filter device 25. By way of example, the sampling device 29 may forward only every third sampled value to the high-pass filter device. It is thereby possible to take account of the transient response of the decimation filter or the digital filter.

The output signal of the sampling device 29 is simultaneously the output signal AS of the sensor arrangement, which signal can be processed further by means of elements connected downstream, for example a digital signal processor (not shown).

The clocked elements of the arrangement, that is to say the clocked switches 14 and 15, the demodulator 24, the sampling device 29 and the counter 26, are preferably clocked by the same clock frequency CLK in order to synchronize the elements. The internal clock or counting frequency of the counter may be higher by comparison therewith. This serves for better stabilization of the control loop.

The closed control loop, which feeds the interference signal, for example the offset, back to the input of the evaluation device 20, makes it possible to reduce the interference signal to a minimum. What is thereby achieved at the same time is that the output operating point of the output amplifier of the sensor element can operate in an optimum linear range. This results, in the case of this dynamic interference signal compensation, in a stable setting of the operating point of the sensor relative to interference signals which compensates both for the temperature-dependent variables and for the process-dependent variables during sensor production. High requirements made of the linearity of the sensor can be implemented in this way, so that manual adjustment of the sensor is not necessary.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

We claim:

1. A sensor, comprising:
   a sensor element configured for outputting a sensor signal comprising an interference signal;
   a chopper device;
   a filter device; and
   an evaluation device coupled to the sensor element and comprising a subtractor which is coupled to said chopper device and said filter device, and subtracts the interference signal from the sensor signal.

2. The sensor as claimed in claim 1, wherein the chopper device alternately inverts and does not invert the signal present at the input of the chopper device, and the chopper device is connected to a demodulator.

3. The sensor as claimed in claim 2, wherein the filter device comprises a bandpass filter device or a high-pass filter device, which controls a counter or integrator, the count/summation value of which corresponds to the value of the interference signal, and a digital-to-analog converter connected downstream of the counter/integrator, the converter converting the counter value/summation value into an analog signal.

4. The sensor as claimed in claim 3, wherein the digital-to-analog converter of the filter device is connected to the subtractor on the output side.

5. The sensor as claimed in claim 1, wherein the evaluation device comprises an analog-to-digital converter, which digitizes the output signal of the subtractor.

6. The sensor as claimed in claim 5, wherein the analog-to-digital converter is a sigma-delta modulator.

7. The sensor as claimed in claim 5, wherein the chopper device is connected upstream of the analog-to-digital converter.

8. The sensor as claimed in claim 1, wherein the subtractor is connected to a load circuit on the output side.

9. The sensor as claimed in claim 1, wherein the sensor is a Hall Sensor.

10. A method for filtering an interference signal from an interference-signal-beset signal of a sensor, comprising:
    alternately chopping the interference-signal-beset signal in a chopper device; and
    filtering out the interference signal from an output signal of the chopper device by means of a high-pass filter or a bandpass filter.

11. The method as claimed in claim 10, wherein the sensor is a Hall sensor.

12. A method for compensating for an interference signal contained in an interference-signal-beset signal of a sensor, comprising:
    alternately chopping the interference-signal-beset signal by means of a chopper device; and
    then filtering out an output signal of the chopper device by means of a high-pass filter or a bandpass filter in order to filter out the interference signal; and
    subtracting the interference signal from the sensor signal.

13. The method as claimed in claimed 12, wherein the output signal of the sensor element is converted into a digital signal and the output signal of the high-pass/bandpass filter device is converted back into an analog signal.

14. The method as claimed in claim 12, wherein the output signal of the high-pass filter device is summed by a counter/integrator, the count/summation value of which is converted into an analog signal by means of a digital-to-analog converter.

15. The method as claimed in claim 12, wherein the output signal of the analog-to-digital converter is decimated and sampled.

* * * * *

UNITED STATES PATENT AND TRADEMARK OFFICE
CERTIFICATE OF CORRECTION

PATENT NO. : 7,701,207 B2  
APPLICATION NO. : 11/517837  
DATED : April 20, 2010  
INVENTOR(S) : Siegfried Rossmann Page 1 of 1

It is certified that error appears in the above-identified patent and that said Letters Patent is hereby corrected as shown below:

Title Page; should read;

--(73)   Assignee:      Austriamicrosystems AG,  
Unterpremstätten (AT) ~~Unterpresmstatten (AU)~~--

Signed and Sealed this  
Second Day of August, 2011

David J. Kappos  
*Director of the United States Patent and Trademark Office*